United States Patent Office 3,702,327
Patented Nov. 7, 1972

3,702,327
N-BETA-1-(3-PHENYLIMIDAZOLIDIN-2-ONE)
ETHYL 4,4-ETHYLENE DIOXYPIPERIDINES
Jorge Pengman Li, Scotch Plains, N.J., and John Hans Biel, Lake Bluff, Ill., assignors to Aldrich Chemical Company, Inc., Milwaukee, Wis.
No Drawing. Filed Dec. 28, 1970, Ser. No. 102,171
Int. Cl. C07d 99/02
U.S. Cl. 260—293.66
18 Claims

ABSTRACT OF THE DISCLOSURE

Compounds of the formula

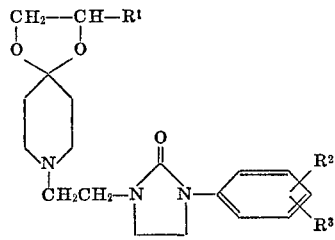

wherein $R^1$ is a member selected from the group consisting of hydrogen, (lower) alkyl, phenyl and benzyl, and $R^2$ and $R^3$ each represent a member selected from the group consisting of chloro, bromo, iodo and trifluoromethyl; and the pharmaceutically acceptable nontoxic salts thereof exhibit tranquilizing activity and are useful as tranquilizers and antiemetic agents in mammals.

BACKGROUND OF THE INVENTION (1) Field of the invention

This invention relates to novel compounds exhibiting tranquilizing and antiemetic activity which are useful as tranquilizers and antiemetic agents in mammals. In another aspect, this invention relates to a method of preparing the novel compounds.

(2) Description of the prior art

U.S. Pat. No. 3,196,152 describes various substituted imidazolidinones useful as tranquilizers including imidoline, 1 - dimethylaminoethyl - 3 - (m-chlorophenyl)-2-imidazolidinone. U.S. Pat. No. 3,355,457 relates to various substituted imidazolinones described as useful as intermediates for the preparation of the corresponding substituted imidazolidinones. Other patents reported from searches are U.S. Pat. Nos. 3,334,112, 3,374,237, 3,446,816, 3,459,757, 3,465,080, 2,985,663 and 3,334,115, French Pat. No. 2288M and British Pat. No. 972,003. The compounds of this invention are distinguishable from the compounds described in the foregoing patents.

SUMMARY OF THE INVENTION

There is provided according to the present invention compounds represented by the following structural formula (I)

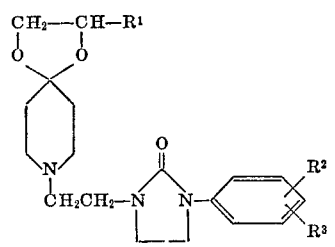

wherein $R^1$ is a member selected from the group, consisting of hydrogen, (lower) alkyl, phenyl and benzyl, and $R^2$ and $R^3$ each represent a member selected from the group consisting of chloro, bromo, iodo and trifluoromethyl; and the pharmaceutically acceptable nontoxic salts thereof.

The pharmaceutically acceptable nontoxic salts include the organic and inorganic acid addition salts e.g., those prepared from acids such as hydrochloric, sulfuric, sulfonic, tartaric, fumaric, hydrobromic, hydriodic, glycolic, citric, maleic, phosphoric, succinic, acetic and the like. Such salts are prepared by conventional methods by reacting the free base with the desired acid on about an equimolar basis.

The term "(lower) alkyl" as used herein means both straight and branched chain alkyl radicals containing from 1 to 8 carbon atoms, e.g., methyl, ethyl, propyl, isopropyl, butyl, isobutyl, t-butyl, amyl, hexyl, 2-ethylhexyl, etc.

A preferred embodiment of the present invention consists of the compounds of the formula (II)

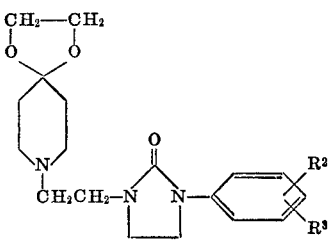

wherein $R^2$ and $R^3$ are as previously defined.

A still more preferred embodiment of the present invention consists of the compounds of the formula (III)

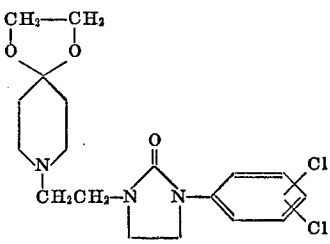

The compounds of the present invention are prepared as exemplified below by the reaction of a 4,4-ethylenedioxypiperidine of the formula (IV)

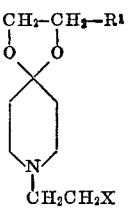

wherein $R^1$ is as previously defined and X is a reactive halogen atom, e.g. chloro or bromo or a tosyl radical; with an equivalent of an imidazolidinone of the formula (V)

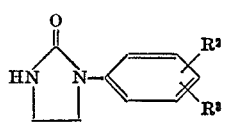

wherein $R^2$ and $R^3$ are as previously defined.

The reaction is preferably carried out by treating the imidazolidinone of Formula V with one equivalent of sodium, sodamide or an alkali metal hydride, e.g., sodium hydride to form an alkali metal salt of the imidazolidinone, e.g., the sodium salt and then contacting the salt with one equivalent of a 4,4-ethylenedioxypiperidine of Formula IV and preferably the chloride or bromide in an anhydrous unreactive solvent medium at a temperature of from about 20 to 150° C., and preferably 50 to 70° C. Suitable solvent media include dimethylacetamide, tetrahydrofuran, dimethylformamide, benzene, toluene and the like and preferably dimethylacetamide. The general reaction is described in U.S. Pat. No. 3,196,152.

The ethylenedioxypiperidines of Formula IV used as starting materials are produced as exemplified below by first reacting a 4,4-ethylenedioxypiperidine of the formula (VI) 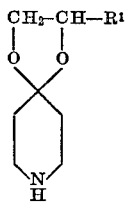

wherein $R^1$ is as described above with ethylene chlorohydrin to produce an alcohol of the formula (VII) 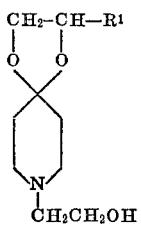

and then reacting the alcohol of Formula VII with thionyl chloride, thionyl bromide or p-toluene sulfonyl chloride or the like to produce the compounds of Formula IV.

The 4,4-ethylenedioxypiperidines of Formula VI are produced according to the method of Stach et al., Monatshefte der Chemie, 93, 1090 (1962); Chem. Abstr. 59, 8750g., by reacting a piperidone hydrochloride with the appropriate ethylene glycol and removing the water formed azeotropically with benzene.

The imidazolidinones of Formula V are prepared as exemplified below by (a) reacting a substituted aniline of the formula (VIII) 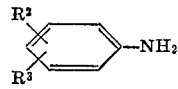

wherein $R^2$ and $R^3$ are as previously defined with 2-bromoethylamine hydrobromide to produce a diamine of the formula (IX) 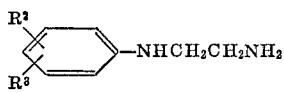

wherein $R^2$ and $R^3$ are as previously defined (b) reacting the diamine of Formula IX with potassium cyanate in the presence of hydrochloric acid to produce a urea of the formula (X) 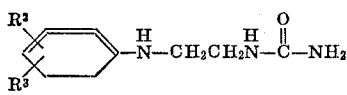

wherein $R^2$ and $R^3$ are as previously defined and (c) cyclizing the urea of Formula X by heating at about 190° C. to produce the compounds of Formula V.

The compounds of this invention can also be prepared by reacting a tosylate of the formula (XI) 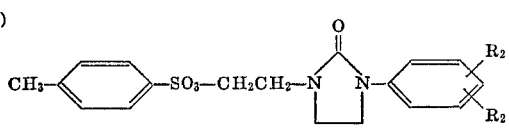

wherein $R^2$ and $R^3$ are as previously defined with about an equimolar amount of a 4,4-ethylenedioxypiperidine of Formula IV. The reaction is carried out in the presence of an acid acceptor, e.g., triethylamine, pyridine, sodium hydroxide and the like and in the presence of an unreactive solvent such as benzene, toluene, tetrahydrofuran and the like at a temperature of from about 20 to 150° C.

The tosylates of Formula XI are prepared by reacting an imidazolidinone of Formula V with one equivalent of sodium, sodamide or an alkali metal hydride, e.g., sodium salt and then contacting the salt with one equivalent of 2-(2-chloroethoxy) tetrahydropyran to produce an imidazolidinone of the formula (XII) 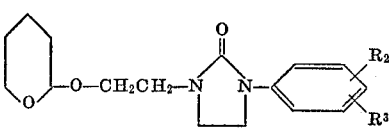

wherein $R^2$ and $R^3$ are as previously defined. The reaction is carried out in a nonreactive solvent, e.g., dimethylacetamide at a temperature of from about 20 to 150° C. and preferably at about 100° C.

The imidazolidinone of Formula XII is treated with a strong acid, e.g., hydrochloric acid to produce an imidazolidinone of the formula (XIII) 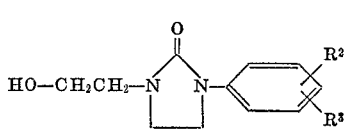

where $R^2$ and $R^3$ are as previously defined. Reaction of the imidazolidinone of Formula XIII with p-toluenesulfonyl chloride in the presence of an acid acceptor (previously defined) at low temperature, e.g., 0° C. produces the tosylate of Formula XI. The foregoing reaction sequence is exemplified below.

The compounds of this invention possess tranquilizing activity and antiemetic activity making them useful as tranquilizers and antiemetics in mammals.

The tranquilizing activity of the compounds of this invention was evaluated by the standard condition response test. When for example 1-[2-(4,4-ethylenedioxypiperidino)ethyl]-3-(3,5 - dichlorophenyl) - 2 - imidazolidinone was administered to the rat p.o. the avoidance $ED_{50}$ was <1 mg./kg. and the escape $ED_{50}$ was 50 mg./kg. The compound exhibited a long duration of action.

The antiemetic activity of the compounds of this invention was evaluated by the standard antiapomorphine test. In the test, dogs are administered the test compound p.o. 60 minutes prior to intravenous administration of a dosage of 50 mg./kg. of apomorphine. Failure of the dog to vomit is a positive response. When for example 1-[2-(4,4-ethylenedioxypiperidino)ethyl] - 3 - (3,5 - dichlorophenyl) - 2-imidazolidinone was tested, it exhibited a minimal effective dose (MED) of ≤0.5 mg./kg. in the dog.

The toxicity ($LD_{50}$) of 1-[2-(4,4-ethylenedioxypiperidino)ethyl]-3-(3,5 - dichlorophenyl) - 2 - imidazolidinone was determined and the results are set forth in the table below.

| Species | Route | $LD_{50}$ mg./kg. |
| --- | --- | --- |
| Mouse | P.o. | 450 |
| Do | I.p. | 245 |
| Rat | P.o. | 470 |
| Rat | I.p. | 420 |

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar, elixirs, syrups and water including sterile water. The composition may take the form of tablets, powders, granules, capsules, suspensions, solutions, and the like.

The compounds of this invention when administered orally or parenterally in a tranquilizing or antiemetic amount are effective in tranquilizing mammals and inhibiting vomiting in mammals. An oral dosage range of about 0.3 to about 5 milligrams per kilogram per day is convenient for tranquilizing mammals and a range of about 0.5 to about 5 milligrams per kilogram per day is convenient for inhibiting vomiting in mammals, which may be administered in divided dosage, e.g., two, three or four times a day. In man an oral dosage range of about 10 to about 200 milligrams per day for tranquilizing and about 15 to about 200 milligrams per day for inhibiting vomiting is convenient. For further information with respect to the administration of the compounds of this invention to man, publications can be consulted which relate to the administration to man of imidoline.

Administration of the compounds is conveniently begun at the minimal effective dose (MED) or $ED_{50}$ of the particular compound in the particular species of mammal. However, in general, the particular dosage most suitable for a particular application, as might be expected, will vary with the age, weight and general health of the mammal under treatment and the degree of tranquility or antiemetic effect required. After taking into consideration these factors and any other factors to be considered, one skilled in the art of treating diseases of mammals can readily determine the appropriate dosage.

The following examples are intended to illustrate the invention described herein without unduly restricting it.

EXAMPLE 1

Preparation of 2-(4,4-ethylenedioxypiperidino)ethanol

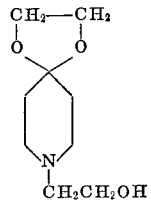

A mixture of 4,4-ethylenedioxypiperidine (25.8 g., 180 mmoles), ethylene chlorohydrin (14.5 g., 180 mmoles), potassium carbonate (27.6 g., 200 mmoles) and toluene (250 ml.) was refluxed for 63 hrs., and filtered. Evaporation of the filtrate afforded the crude product, 26.1 g. (77.4% yield).

The crude product was purified by Kugelrohr-distillation and the product 2-(4,4-ethylenedioxypiperidino)ethanol was obtained as a clear colorless liquid; B.P. 70–75° C./0.002 mm.

Analysis.—Calcd. for $C_{19}H_{17}NO_3$ (percent): C, 57.73; H, 9.17; N, 7.47. Found (percent): C, 57.60; H, 9.02; N, 7.65.

EXAMPLE 2

Preparation of 2-(4,4-ethylenedioxypiperidino)ethyl chloride hydrochloride

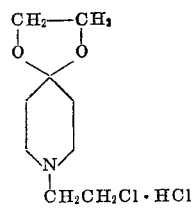

To a stirred solution of 2-(4,4-ethylenedioxypiperidino) ethanol (31.7 g., 170 mmoles) in methylene chloride (50 ml.) was added dropwise at room temperature a solution of thionyl chloride (22.6 g., 190 mmoles) in methylene chloride (30 ml.). The mixture was then heated to gentle reflux for 45 min. and stirred at room temperature for 14 hrs. Evaporation of the mixture afforded the product as a solid, which was purified by several recrystallizations from methanol-petroleum ether (30–60° C.). The product 2-(4,4-ethylenedioxypiperidino)ethyl chloride hydrochloride (9.2 g., 38 mmoles; 23% yield), softened at 160° C. and decomposed at 200° C.

Analysis.—Calcd. for $C_9H_{17}Cl_2NO_2$ (percent): C, 44.64; H, 7.07; N, 5.98; Cl, 29.28. Found (percent): C, 44.50; H, 6.98; N, 5.58; Cl, 29.13.

Conversion to free base: 2-(4,4-ethylenedioxypiperidino)ethyl chloride hydrochloride (6.14 g.) was dissolved in methylene chloride (50 ml.). Potassium hydroxide (1.79 g.) in water was added and the mixture stirred. The organic layer was separated and the aqueous layer was extracted with methylene chloride. The combined organic solution was dried over sodium sulfate (anhydrous), filtered and evaporated in vacuo to a yellowish oil. Yield: 5.10 g., 2-(4,4-ethylenedioxypiperidino)ethyl chloride.

EXAMPLE 3

Preparation of N-(3,5-dichlorophenyl)ethylenediamine

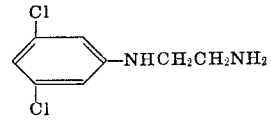

A mixture of 121.5 g. (0.75 mol) 3,5-dichloroaniline, 77.9 g. (0.38 mol) 2-bromoethylamine hydrobromide in 250 ml. toluene was refluxed for two days with good stirring (paddle stirrer). The mixture dissolved upon heating, but after 3 hours, a solid began to precipitate. After two days, 250 ml. water and 100 ml. 50% potassium hydroxide solution was added to the cooled mixture. The organic layer was separated and the aqueous layer was saturated with sodium chloride and extracted with benzene. The combined organic solution was washed with saturated sodium chloride solution, dried over magnesium sulfate, filtered, and evaporated in vacuo. The dark liquid residue was vacuum distilled on the Kugelrohr to give a white solid at 80–85° C./0.03 mm. The product N-(3,5-dichlorophenyl)ethylenediamine was obtained as a yellow oil at 115–125° C./0.05 mm., which crystallized in the receiver, 62.0 g. (79%). Thin layer chromatography (micro alumina plate; 50% ethyl acetate: isopropanol; $I_2$) showed one component.

EXAMPLE 4

Preparation of N-[2-(3,5-dichloroanilino)ethyl]urea

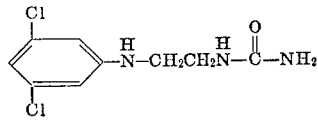

To a solution of 39.1 g. (0.19 mol) N-(3,5-dichlorophenyl)ethylene diamine in 80 ml. 2.5 N hydrochloric acid solution was added 16.2 g. (0.20 mol) potassium cyanate. The mixture was refluxed for 4 hours. The solid was collected by filtration and washed several times with water. It was then dissolved in boiling ethyl acetate (charcoal-treated), and the solvent was concentrated to 175 ml. The solution was diluted with 50 ml. petroleum ether, and the solid which crystallized, N-[2-(3,5-dichloroanilino) ethyl]urea was collected by filtration and dried to give 34.3 g. (72.6%), M.P. 153–156° C.

EXAMPLE 5

Preparation of 1-(3,5-dichlorophenyl)-2-imidazolidinone

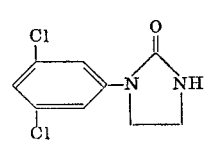

N - [2 - (3,5 - dichloroanilino)ethyl]urea, 34.3 g. (0.138 mol), was heated in a Wood's metal bath at 190° C. for 1.5 hrs. (until NH₃ evolution ceased, and at which time the melt had again solidified). The solid was cooled, triturated with acetone and dried to give 30.6 g. (95.6%), 1 - (3,5 - dichlorophenyl) - 2 - imidazolidinone, M.P. 202–205° C.

EXAMPLE 6

Preparation of 1-[2-(4,4-ethylenedioxypiperidino) ethyl]-3-(3,5-dichlorophenyl)-2-imidazolidinone

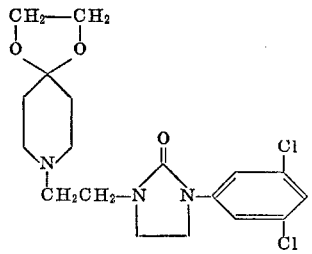

A solution of 1 - (3,5 - dichlorophenyl) - 2 - imidazolidinone (6.76 g., $2.92 \times 10^{-2}$ mol) in dimethylacetamide (150 ml.) was added slowly to a stirred suspension of sodium hydride (0.77 g., $3.2 \times 10^{-2}$ mol) in dimethylaceamide (75 ml.). Evolution of hydrogen was slow, even after heating to 90° C. More sodium hydride (0.10 g., $4.17 \times^{-3}$ mol) was added and this stirred for 20 hours. 2-(4,4-ethylenedioxypiperidino)-ethyl chloride (5.10 g., $2.92 \times 10^{-2}$ mol) was added to the stirred slurry in dimethylacetamide (50 ml.). After stirring for 24 hours, this mixture was heated to 60° C. for 8 hours. A small amount of methanol was then added to destroy excess reagent. This mixture was evaporated, in vacuo, and the residue was stirred with water. This was extracted with several portions of ether. The ethereal solution was washed with several portions of water, dried over sodium sulfate (anhydrous), filtered, and evaporated, in vacuo, to a light-colored solid (10.37 g.). This material was distilled twice in a Kugelrohr apparatus at 180° C./$5 \times 10^{-4}$ mm. (with considerable yield of lower boiling foreruns) to afford a yellow oil which solidifies. Yield: 5.77 g., $1.44 \times 10^{-2}$ mol (49.3% of theory) of 1-[2-(4,4-ethylenedioxypiperidino) ethyl]-3-(3,5-dichlorophenyl)-2-imidazolidinone.

*Analysis.*—Calcd. for $C_{18}H_{23}Cl_2N_3O_3$ (MW 400.32) (percent): C, 54.01; H, 5.80; N, 10.50; Cl, 17.71. Found (percent): C, 53.89; H, 5.97; N, 10.66; Cl. 17.65.

EXAMPLE 7

Preparation of 1 - [2 - (4,4 - ethylenedioxypiperidino) ethyl] - 3 - (3,5 - dichlorophenyl) - 2-imidazolidinone: (Larger scale)

2 - (4,4 - ethylenedioxypiperidino)ethanol, 98.16 g. (0.525 mol) in 250 ml. chloroform was treated with HCl (g.) for 30 minutes. Thionyl chloride, 74.9 g. (0.629 mol), in 250 ml. chloroform was added dropwise and the solution was refluxed for 7 hrs. and stirred overnight at ambient temperature. Solvent was removed in vacuo and the residue was treated with ether. The ether was removed in vacuo, the last traces being removed with a vacuum pump, to yield 123 g. of a solid; 2-(4,4-ethylenedioxypiperidino) ethyl chloride hydrochloride;

$\lambda_{max.}^{Nujol}$—no OH band; weak C=O absorption

A portion, 1.0 g., was taken to the free base with dilute potassium carbonate extracted with methylene chloride, washed with saturated salt solution, and dried with magnesium sulfate. Filtration and removal of solvent gave 0.65 g. (80%) of an oil;

$\lambda_{max.}^{film}$—no OH; weak C=O (Except for the weak carbonyl absorption, this spectrum is identical with that previously obtained.)

In a 5 liter, 3 necked flask equipped with a condenser and addition funnnel and under nitrogen was placed 200 ml. tetrahydrofuran. Sodium hydride, 23 g. (as a 50% mineral oil suspension) was added and the solution was warmed to reflux. 1-(3,5-dichlorophenyl)-2-imidazolidinone, 85.5 g., was added as a suspension in tetrahydrofuran (1500 ml.) and the solution was refluxed another two hours after the addition. 2-(4,4-ethylenedioxypiperidino)ethyl chloride hydrochloride, 122 g. (0.05 mol), was dissolved in 250 ml. methylene chloride. Then 33 g. of potassium hydroxide (85%) in a minimum of water was added and the organic layer was separated, washed once with saturated salt solution, and dried (MgSO₄) for 30 minutes. The solution was filtered and the solvent removed in vacuo to leave a brown oil;

$\lambda_{max.}^{film}$ 2.85–3.00 (s), 5.85 (w), 8.78 (s), 9.15 (s), 9.64 (s) μ

This oil was dissolved in 200 ml. tetrahydrofuran and added dropwise to the refluxing solution over 2 hrs. and refluxed overnight. After this time the reaction appeared to be complete but refluxing was continued for a total of 36 hrs. The solution was cooled, 25 ml. ethanol was added and the solvent was removed in vacuo. The residue was treated with water, extracted with methylene chloride and dried (MgSO₄). Filtration and removal of solvent in vacuo gave an oil which solidified upon trituration with acetone. Removal of acetone in vacuo gave 162 g. of solid which was triturated with petroleum ether to remove mineral oil yielding 131.5 g., M.P. 118–140° C. (theory 148 g.).

This material was distilled in small batches (ca. 7 g.) with a forerun to 160° C./$2 \times 10^{-4}$ mm. being discarded and the product being collected at 180–195° C./$2 \times 10^{-4}$ mm. as a glass. Trituration with and removal of acetone gave a solid. In this way 75 g. of a yellow solid was obtained. The entire material was then triturated with 50 ml. acetone, filtered, and dried in vacuo at 55° C. to yield 68 g.; 1-[2-(4,4-ethylenedioxypiperidino)ethyl]-3-(3,5-dichlorophenyl)-2-imidazolidinone M.P. 140–144° C.;

$\lambda_{max.}^{nujol}$ 5.88 (s) μ

*Analysis.*—Calcd. for $C_{18}H_{23}Cl_2N_3O_3$: C, 54.01; H, 5.79; N, 10.50. Found (percent): C, 54.05; H, 5.77; N, 10.61.

EXAMPLE 8

When in the procedure of Example 1, 4,4-ethylenedioxypiperidine is replaced by an equal molar amount of 4,4-methylethylenedioxypiperidine,
4,4-ethylethylenedioxypiperidine,
4,4-phenylethylenedioxypiperidine,
4,4-benzylethylenedioxypiperidine,
4,4-propylethylenedioxypiperidine,
4,4-isopropylethylenedioxypiperidine,
4,4-hexylethylenedioxypiperidine,
4,4-isobutylethylenedioxypiperidine,
4,4-butylethylenedioxypiperidine, and
4,4-t-butylethylenedioxypiperidine, there are obtained 2-(4,4-methylethylenedioxypiperidino)
2-(4,4-ethylethylenedioxypiperidino)ethanol,
2-(4,4-phenylethylenedioxypiperidino)ethanol,
2-(4,4-benzylethylenedioxypiperidino)ethanol,
2-(4,4-propylethylenedioxypiperidino)ethanol,
2-(4,4-isopropylethylenedioxypiperidino)ethanol,
2-(4,4-hexylethylenedioxypiperidino)ethanol,
2-(4,4-isobutylethylenedioxypiperidino)ethanol,
2-(4,4-butylethylenedioxypiperidino)ethanol, and
2-(4,4-t-butylethylenedioxypiperidino)ethanol, respectively.

EXAMPLE 9

When in the procedure of Example 2, 2-(4,4-ethylenedioxypiperidino)ethanol is replaced by an equal molar amount of each of the products of Example 8, there are obtained, 2-(4,4-methylenedioxypiperidino)ethyl chloride,
2-(4,4-ethylethylenedioxpiperidino)ethyl chloride,
2-(4,4-phenylethylenedioxpiperidino)ethyl chloride,
2-(4,4-benzylethylenedioxypiperidino)ethyl chloride,
2-(4,4-propylethylenedioxypiperidino)ethyl chloride,
2-(4,4-isopropylethyenedioxypiperidino)ethyl chloride,
2-(4,4-hexylethylenedioxypiperidino)ethyl chloride,
2-(4,4-isobutylethylenedioxypiperidino)ethyl chloride,
2-(4,4-butylethylenedioxypiperidino)ethyl chloride,
2-(4,4-t-butylethylenedioxypiperidino)ethyl chloride, respectively.

EXAMPLE 10

When in the procedure of Example 6, 2-(4,4-ethylenedioxypiperidino)ethyl chloride is replaced by an equal molar amount of each of the products of Example 9, there are obtained, 1-[2-(4,4-methylethylenedioxypiperidino)ethyl]-3-(3,5-dichlorophenyl)-2-imidazolidinone,
1-[2-(4,4-ethylethylenedioxypiperidino)ethyl]-3-(3,5-dichlorophenyl)-2-imidazolidinone,
1-[2-(4,4-phenylethylenedioxypiperidino)ethyl]-3-(3,5-dichlorophenyl)-2-imidazolidinone,
1-[2-(4,4-benzylethylenedioxypiperidino)ethyl]-3-(3,5-dichlorophenyl)-2-imidazolidinone,
1-[2-(4,4-propylethylenedioxypiperidino)ethyl]-3-(3,5-dichlorophenyl)-2-imidazolidinone,
1-[2-(4,4-isopropylethylenedioxypiperidino)ethyl]-3-(3,5-dichlorophenyl)-2-imidazolidinone,
1-[2-(4,4-hexylethylenedioxypiperidino)ethyl]-3-(3,5-dichlorophenyl)-2-imidazolidinone,
1-[2-(4,4-isobutylethylenedioxypiperidino)ethyl]-3-(3,5-dichlorophenyl)-2-imidazolidinone,
1-[2-(4,4-butylethylenedioxypiperidino)ethyl]-3-(3,5-dichlorophenyl)-2-imidazolidinone, and
1-[2-(4,4-t-butylethylenedioxypiperidino)ethyl]-3-(3,5-dichlorophenyl)-2-imidazolidinone, respectively.

EXAMPLE 11

When in the procedure of Example 3, 3,5-dichloroaniline is replaced by an equal molar amount of 2,4-dichloroaniline,
2,6-dichloroaniline,
2,3-dichloroaniline,
2,5-dichloroaniline,
3,4-dichloroaniline,
2,4-dibromoaniline,
3,5-dibromoaniline,
2,6-dibromoaniline,
2,3-dibromoaniline,
2,5-dibromoaniline,
3,4-dibromoaniline,
2,4-diiodoaniline,
3,5-diiodoaniline,
2,6-diiodoaniline,
2,3-diiodoaniline,
2,5-diiodoaniline,
3,4-diiodoaniline,
2,4-ditrifluoromethylaniline,
3,5-ditrifluoromethylaniline,
2,6-ditrifluoromethylaniline,
2,3-ditrifluoromethylaniline,
2,5-ditrifluoromethylaniline,
3,4-ditrifluoromethylaniline,
3-bromo-5-chloroaniline,
3-iodo-5-chloroaniline,
3-trifluoromethyl-5-chloroaniline,
2-bromo-4-chloroaniline,
3-bromo-5-trifluoromethylaniline,
2-bromo-6-chloroaniline, and
3-chloro-4-trifluoromethylaniline, there are obtained N-(2,4-dichlorophenyl)ethylenediamine,
N-(2,6-dichlorophenyl)ethylenediamine,
N-(2,3-dichlorophenyl)ethylenediamine,
N-(2,5-dichlorophenyl)ethylenediamine,
N-(3,4-dichlorophenyl)ethylenediamine,
N-(2,4-dibromophenyl)ethylenediamine,
N-(3,5-dibromophenyl)ethylenediamine,
N-(2,6-dibromophenyl)ethylenediamine,
N-(2,3-dibromophenyl)ethylenediamine,
N-(2,5-dibromophenyl)ethylenediamine,
N-(3,4-dibromophenyl)ethylenediamine,
N-(2,4-diiodophenyl)ethylenediamine,
N-(3,5-diiodophenyl)ethylenediamine,
N-(2,6-diiodophenyl)ethylenediamine,
N-(2,3-diiodophenyl)ethylenediamine,
N-(2,5-diiodophenyl)ethylenediamine,
N-(3,4-diiodophenyl)ethylenediamine,
N-(2,4-ditrifluoromethylphenyl)ethylenediamine,
N-(3,5-ditrifluoromethylphenyl)ethylenediamine,
N-(2,6-ditrifluoromethylphenyl)ethylenediamine,
N-(2,3-ditrifluoromethylphenyl)ethylenediamine,
N-(2,5-ditrifluoromethylphenyl)ethylenediamine,
N-(3,4-ditrifluoromethylphenyl)ethylenediamine,
N-(3-bromo-5-chlorophenyl)ethylenediamine,
N-(3-iodo-5-chlorophenyl)ethylenediamine,
N-(3-trifluoromethyl-5-chlorophenyl)ethylenediamine,
N-(2-bromo-4-chlorophenyl)ethylenediamine,
N-(3-bromo-5-trifluoromethylphenyl)ethylenediamine,
N-(2-bromo-6-chlorophenyl)ethylenediamine, and
N-(3-chloro-4-trifluoromethyl)ethylenediamine, respectively.

EXAMPLE 12

When in the procedure of Example 4, N-(3,5-dichlorophenyl)ethylenediamine is replaced by an equal molar amount of each of the products of Example 11, there are obtained, N-[2-(2,4-dichloroanilino)ethyl]urea,
N-[2-(2,6-dichloroanilino)ethyl]urea,
N-[2-(2,3-dichloroanilino)ethyl]urea,
N-[2-(2,5-dichloroanilino)ethyl]urea,
N-[2(3,4-dichloroanilino)ethyl]urea,
N-[2-(2,4-dibromoanilino)ethyl]urea,
N-[2-(3,5-dibromoanilino)ethyl]urea,
N-[2-(2,6-dibromoanilino)ethyl]urea,
N-[2-(2,3-dibromoanilino)ethyl]urea,
N-[2-(2,5-dibromoanilino)ethyl]urea,
N-[2-(3,4-dibromoanilino)ethyl]urea,
N-[2-(2,4-diiodoanilino)ethyl]urea,
N-[2-(3,5-diiodoanilino)ethyl]urea,
N-[2-(2,6-diiodoanilino)ethyl]urea,
N-[2-(2,3-diiodoanilino)ethyl]urea,
N-[2-(2,5-diiodoanilino)ethyl]urea,
N-[2-(3,4-diiodoanilino)ethyl]urea,
N-[2-(2,4-ditrifluoromethylanilino)ethyl]urea,
N-[2-(3,5-ditrifluoromethylanilino)ethyl]urea,
N-[2-(2,6-ditrifluoromethylanilino)ethyl]urea,
N-[2-(2-bromo-4-chloroanilino)ethyl]urea,
N-[2-(3-bromo-5-trifluoromethylanilino)ethyl]urea,
N-[2-(2-bromo-6-chloroanilino)ethyl]urea, and
N-[2-(3-chloro-4-trifluoromethylanilino)ethyl]urea, respectively.

EXAMPLE 13

When in the procedure of Example 5, N-2-(3,5-dichloroanilino)ethyl urea is replaced by an equal molar amount of each of the products of Example 12, there are obtained 1-(2,4-dichlorophenyl)-2-imidazolidinone
1-(2,6-dichlorophenyl)-2-imidazolidinone
1-(2,3-dichlorophenyl)-2-imidazolidinone
1-(2,5-dichlorophenyl)-2-imidazolidinone
1-(3,4-dichlorophenyl)-2-imidazolidinone
1-(2,4-dibromophenyl)-2-imidazolidinone 1-(3,5-dibromophenyl)-2-imidazolidinone
1-(2,6-dibromophenyl)-2-imidazolidinone,
1-(2,3-dibromophenyl)-2-imidazolidinone
1-(2,5-dibromophenyl)-2-imidazolidinone,
1-(3,4-dibromophenyl)-2-imidazolidinone,
1-(2,4-difluorophenyl)-2-imidazolidinone,
1-(3,5-difluorophenyl)-2-imidazolidinone,
1-(2,6-difluorophenyl)-2-imidazolidinone,
1-(2,3-difluorophenyl)-2-imidazolidinone,
1-(2,5-difluorophenyl)-2-imidazolidinone,
1-(3,4-difluorophenyl)-2-imidazolidinone,
1-(2,4-diiodophenyl)-2-imidazolidinone,
1-(3,5-diiodophenyl)-2-imidazolidinone,
1-(2,6-diiodophenyl)-2-imidazolidinone,
1-(2,3-diiodophenyl)-2-imidazolidinone,
1-(2,5-diiodophenyl)-2-imidazolidinone,
1-(3,4-diiodophenyl)-2-imidazolidinone,
1-(2,4-ditrifluoromethylphenyl)-2-imidazolidinone,
1-(3,5-ditrifluoromethylphenyl)-2-imidazolidinone,
1-(2,6-ditrifluoromethylphenyl)-2-imidazolidinone,
1-(2,3-ditrifluoromethylphenyl)-2-imidazolidinone,
1-(2,5-ditrifluoromethylphenyl)-2-imidazolidinone,
1-(3,4-ditrifluoromethylphenyl)-2-imidazolidinone,
1-(3-bromo-5-chlorophenyl)-2-imidazolidinone,
1-(3-iodo-5-chlorophenyl)-2-imidazolidinone,
1-(3-trifluoromethyl-5-chlorophenyl)-2-imidazolidinone,
1-(2-bromo-4-chlorophenyl)-2-imidazolidinone,
1-(3-bromo-5-trifluoromethylphenyl)-2-imidazolidinone,
1-(2-bromo-6-chlorophenyl)-2-imidazolidinone, and
1-(3-chloro-4-trifluoromethylphenyl)-2-imidazolidinone, respectively.

EXAMPLE 14

When in the procedure of Example 6, 1-(3,5-dichlorophenyl)-2-imidazolidinone is replaced by an equal molar amount of each of the products of Example 13, there are obtained, 1-[2-(4,4-ethylenedioxypiperidino)ethyl]-3-(2,4-dichlorophenyl)-2-imidazolidinone,
1-[2-(4,4-ethylenedioxypiperidino)ethyl]-3-(2,6-dichlorophenyl)-2-imidazolidinone,
1-[2-(4,4-ethylenedioxypiperidino)ethyl]-3-(2,4-dichlorophenyl)-2-imidazolidinone,
1-[2-(4,4-ethylenedioxypiperidino)ethyl]-3-(2,5-dichlorophenyl)-2-imidazolidinone,
1-[2-(4,4-ethylenedioxypiperidino)ethyl]-3-(3,4-dichlorophenyl)-2-imidazolidinone,
1-[2-(4,4-ethylenedioxypiperidino)ethyl]-3-(2,4-dibromophenyl)-2-imidazolidinone,
1-[2-(4,4-ethylenedioxypiperidino)ethyl]-3-(3,5-dibromophenyl)-2-imidazolidinone,
1-[2-(4,4-ethylenedioxypiperidino)ethyl]-3-(2,6-dibromophenyl)-2-imidazolidinone,
1-[2-(4,4-ethylenedioxypiperidino)ethyl]-3-(2,3-dibromophenyl)-2-imidazolidinone,
1-[2-(4,4-ethylenedioxypiperidino)ethyl]-3-(2,5-dibromophenyl)-2-imidazolidinone,
1-[2-(4,4-ethylenedioxypiperidino)ethyl]-3-(3,4-dibromophenyl)-2-imidazolidinone,
1-[2-(4,4-ethylenedioxypiperidino)ethyl]-3-(2,4-diiodophenyl)-2-imidazolidinone,
1-[2-(4,4-ethylenedioxypiperidino)ethyl]-3-(3,5-diiodophenyl)-2-imidazolidinone,
1-[2-(4,4-ethylenedioxypiperidino)ethyl]-3-(2,6-diiodophenyl)-2-imidazolidinone,
1-[2-(4,4-ethylenedioxypiperidino)ethyl]-3-(2,3-diiodophenyl)-2-imidazolidinone,
1-[2-(4,4-ethylenedioxypiperidino)ethyl]-3-(2,5-diiodophenyl)-2-imidazolidinone,
1-[2-(4,4-ethylenedioxypiperidino)ethyl]-3-(3,4-diiodophenyl)-2-imidazolidinone,
1-[2-(4,4-ethylenedioxypiperidino)ethyl]-3-(2,4-ditrifluoromethylphenyl)-2-imidazolidinone,
1-[2-(4,4-ethylenedioxypiperidino)ethyl]-3-(3,5-ditrifluoromethylphenyl)-2-imidazolidinone,
1-[2-(4,4-ethylenedioxypiperidino)ethyl]-3-(2,6-ditrifluoromethylphenyl)-2-imidazolidinone,
1-[2-(4,4-ethylenedioxypiperidino)ethyl]-3-(2,3-ditrifluoromethylphenyl)-2-imidazolidinone,
1-[2-(4,4-ethylenedioxypiperidino)-ethyl]-3-(2,5-ditrifluoromethylphenyl-2-imidazolidinone,
1-[2-(4,4-ethylenedioxypiperidino)ethyl]-3-(3,4-ditrifluoromethylphenyl)-2-imidazolidinone,
1-[2-(4,4-ethylenedioxypiperidino)ethyl]-3-(3-bromo-5-chlorophenyl)-2-imidazolidinone,
1-[2-(4,4-ethylenedioxypiperidino)ethyl]-3-(3-iodo-5-chlorophenyl)-2-imidazolidinone,
1-[2-(4,4-ethylenedioxypiperidino)ethyl]-3-(3-trifluoromethyl-5-chlorophenyl)-2-imidazolidinone,
1-[2-(4,4-ethylenedioxypiperidino)ethyl]-3-(2-bromo-4-chlorophenyl)-2-imidazolidinone,
1-[2-(4,4-ethylenedioxypiperidino)ethyl]-3-(3-bromo-5-trifluoromethylphenyl)-2-imidazolidinone,
1-[2-(4,4-ethylenedioxypiperidino)ethyl]-3-(2-bromo-6-chlorophenyl)-2-imidazolidinone, and
1-[2-(4,4-ethylenedioxypiperidino)ethyl]-3-(3-chloro-4-trifluoromethylphenyl)-2-imidazolidinone, respectively.

EXAMPLE 15

1-[2-(2-tetrahydropyranyloxy)ethyl]-3-(3,5-dichlorophenyl)-2-imidazolidinone

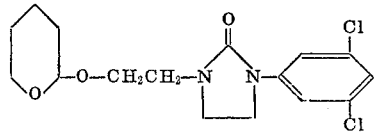

1-(3,5-dichlorophenyl)-2-imidazolidinone, (15.02 g., 0.0649 mol) in dimethylacetamide (150 ml.) was added dropwise to a stirred suspension of 50% sodium hydride (3.17 g.) in dimethylacetamide (50 ml.). When addition was complete, this was heated to 100° C. for 1 hour. Hydrogen gas evolved (1455 ml., 100% of theoretical). This was cooled, and 2-(2-chloroethoxy)tetrahydropyran (10.70 g., 0.0649 mol) in dimethylacetamide (10 ml.) was added. After refluxing for 20 hours, this mixture was evaporated, in vacuo. The residue was suspended in water and extracted with several portions of ether. These were combined, washed with water, 2 N potassium carbonate solution and water, dried over sodium sulfate, filtered and evaporated, in vacuo. The residue was distilled in a Kugelrohr at 97–160° C./3×10⁻⁴ mm. A yellow solid and oil were collected, which contained both starting material and product. This was seen by thin layer chromatography on alumina with methylene chloride (iodine vapor stain; $R_f$ product ~0.7; $R_f$ starting material ~0.14). This mixture was triturated with petroleum ether to yield a solid. This solid was extracted twice with petroleum ether in a soxhlet extraction device. The extracted material was distilled in a Kugelrohr at 90–100° C./3×10⁻⁴ mm. until all starting material was removed. The product, 1-[2-(2-tetrahydropyranyloxy)ethyl] - 3 - (3,5 - dichlorophenyl) - 2-imidazolidinone, then distilled as a dark oil which solidified into a greyish solid. Yield: 14.48 g. (62.1% of theory).

A small sample (1.53 g.) was distilled in a Kugelrohr at 150° C./4×10⁻⁵ mm. to afford the analytical specimen, an oil which formed a white solid (1.36 g.).

*Analysis.*—Calcd. for $C_{16}H_{20}Cl_2N_2O_3$ (M.W. 359.25) (percent): C, 53.50; H, 5.62; N, 7.80. Found (percent): C, 53.22; H, 5.57; N, 7.99.

EXAMPLE 16

Preparation of 1-(2-hydroxyethyl)-3-(3,5-dichlorophenyl)-2-imidazolidinone

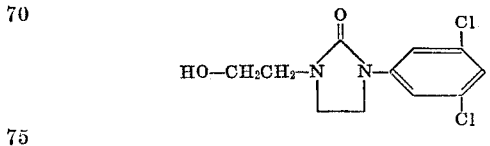

1 - [2 - (2 - tetrahydropyranyloxy)ethyl] - 3 - (3,5 - dichlorophenyl)-2-imidazolidinone (11.36 g., 0.0316 mol) was dissolved in tetrahydrofuran (125 ml.) and 6 N hydrochloric acid (40 ml.). This was refluxed on a steam bath for 23 hours. Tetrahydrofuran was removed, in vacuo, and the aqueous residue was extracted with several portions of ether. These were combined, dried over sodium sulfate, filtered and evaporated, in vacuo, to a brown, fluid oil. Kugelrohr distillation at 80° C./10$^{-2}$ mm. removed a clear liquid. The brown, tacky residue was further distilled at 155° C./4×10$^{-5}$ mm. to afford an oil which slowly crystallized into a white solid, 1-(2-hydroxyethyl)-3-(3,5-dichlorophenyl)-2-imidazolidinone. Yield: 7.32 g. (84.1% of theory). A sample (1.40 g.) was then recrystallized from carbon tetrachloride to afford white needles. Yield: 0.96 g. (68.6% for recrystallization), M.P. 102–103° C. (partial melting with resolidification).

*Analysis.*—Calcd. for $C_{11}H_{12}Cl_2N_2O_2$ (M.W. 275.14) (percent): C, 48.02; H, 4.40; N, 10.19; Cl. 25.78. Found (percent): C, 48.33; H, 4.82; N, 10.12; Cl, 25.9.

EXAMPLE 17

Preparation of 1-(2-p-toluenesulfonyl ethyl)-3-(3,5-dichlorophenyl)-2-imidazolidinone

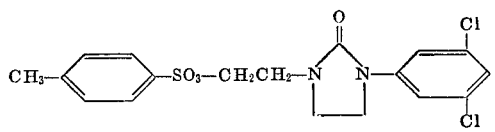

1 - (2 - hydroxyethyl) - 3 - (3,5 - dichlorophenyl) - 2-imidazolidinone (3.61 g., 0.0131 mol) in dry pyridine (20 ml.) was added slowly to a cooled (0° C.) solution of p-toluenesulfonyl chloride (2.74 g., 0.0144 mol) in pyridine (14 ml.). This was allowed to come to room temperature and was stirred for 22 hours. The mixture was evaporated, in vacuo, to a gummy residue which was triturated with ether. It was then dissolved in methylene chloride, washed with several portions of water, dried over sodium sulfate, filtered and evaporated, in vacuo, to a white solid, 1-(2-p-toluenesulfonyl ethyl)-3-(3,5-dichlorophenyl)-2-imidazolidinone. Yield: 4.83 g. (85.8% of theory). This was then recrystallized from benzene to afford white needles. Yield: 3.24 g. (57.7% of theory), M.P. 158–159° C.

*Analysis.*—Calcd. for $C_{18}H_{18}Cl_2N_2O_4S$ (M.W. 429.31) (percent): C, 50.35; H, 4.23; N, 6.53; Cl, 16.52. Found (percent): C, 50.39; H, 4.28; N, 6.48; Cl, 16.65.

EXAMPLE 18

Preparation of 1-[2-(4,4-ethylenedioxypiperidino)ethyl]-3-(3,5-dichlorophenyl)-2-imidazolidinone 1-(2-p-toluenesulfonyl ethyl)-3-(3,5-dichlorophenyl)-2-imidazolidinone (0.44 g., 0.0103 mol) in benzene (40 ml.) was added slowly to a solution of 4,4-ethylenedioxypiperidine (0.161 g., 0.0113 mol) and triethylamine (0.246 g., 0.0206 mol) in benzene (10 ml.). This was refluxed for 48 hours and evaporated, in vacuo. The residue was dissolved in ether and washed with 2 N potassium carbonate solution and water. The organic solution was dried over sodium sulfate, filtered and evaporated, in vacuo, to a tan solid. Yield: 0.33 g. (80.1% of theory). Thin layer chromatography (TLC) on alumina (methylene chloride; iodine vapor stain; $F_f$ product ~0.13) shows this material to be the desired product along with a small amount of material at the solvent front of the TLC. This material was distilled in a Kugelrohr at 170° C./8×10$^{-5}$ mm. to afford an oil which crystallizes into a white solid, 1-[2-(4,4 - ethylenedioxypiperidino)ethyl] - 3 - (3,5 - dichlorophenyl)-2-imidazolidinone. Yield: 0.28 g. (67.9% of theory). The infrared spectrum of this material is identical to that of the product of Examples 6 and 7.

While this invention has been described and exemplified in terms of its preferred embodiment, those skilled in the art will appreciate that modifications can be made without departing from the spirit and scope of the invention.

We claim:

1. A compound selected from the group consisting of compounds of the formula

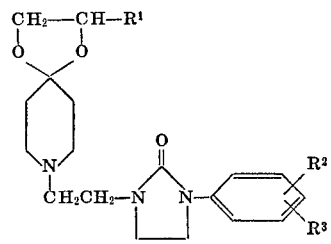

wherein
R$^1$ is a member selected from the group consisting of hydrogen, (lower) alkyl, phenyl and benzyl, and
R$^2$ and R$^3$ each represent a member selected from the group consisting of chloro, bromo, iodo and trifluoromethyl; and
the pharmaceutically acceptable nontoxic salts thereof.

2. A compound of claim 1 having the formula

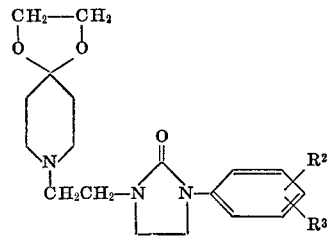

wherein R$^2$ and R$^3$ each represent a member selected from the group consisting of chloro, bromo, iodo and trifluoromethyl; and the pharmaceutically acceptable nontoxic salts thereof.

3. A compound of claim 1 having the formula

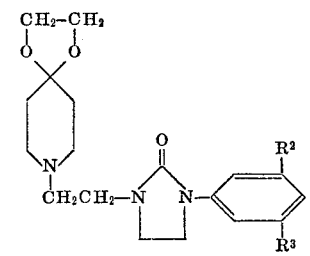

wherein R$^2$ and R$^3$ each represent a member selected from the group consisting of chloro, bromo, iodo and trifluoromethyl.

4. A compound of claim 1 having the formula

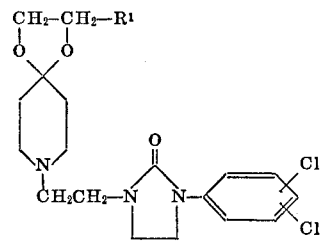

wherein R$^1$ is a member selected from the group consisting of hydrogen, (lower) alkyl, phenyl and benzyl.

5. A compound of claim 1 having the formula

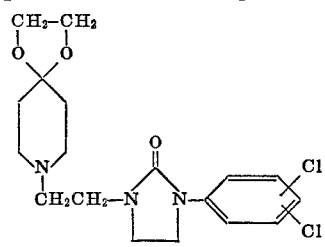

6. A compound of claim 1 having the formula

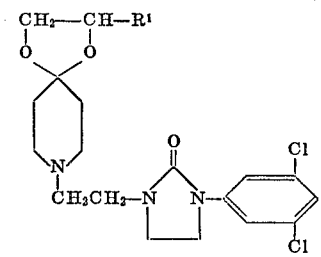

wherein R¹ is a member selected from the group consisting of hydrogen, (lower) alkyl, phenyl and benzyl.

7. The compound of claim 1 having the formula

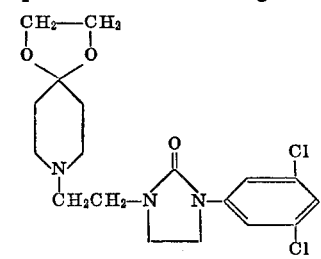

8. A pharmaceutically acceptable nontoxic salt of the compound of claim 7.

9. The compound of claim 1 having the formula

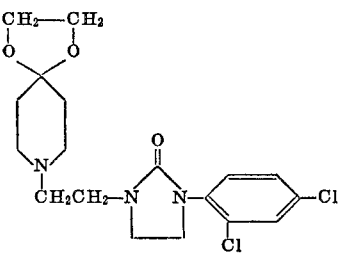

10. The compound of claim 1 having the formula

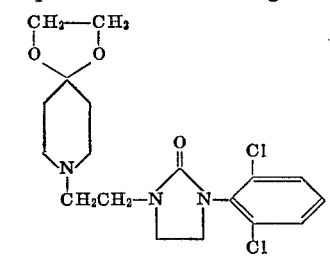

11. The compound of claim 1 having the formula

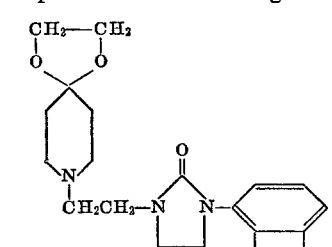

12. The compound of claim 1 having the formula

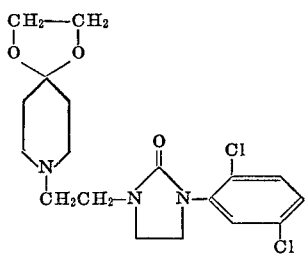

13. The compound of claim 1 having the formula

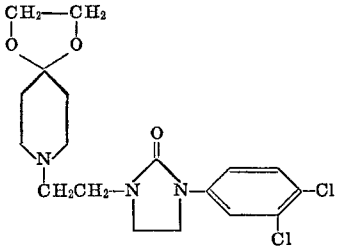

14. The compound of claim 1 having the formula

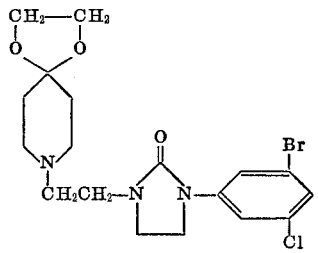

15. The compound of claim 1 having the formula

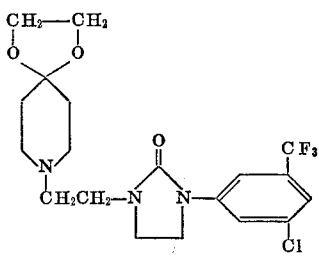

16. The compound of claim 1 having the formula

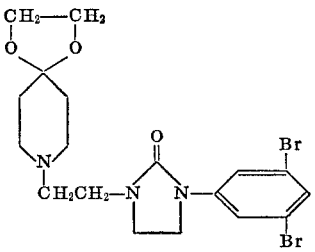

17. The compound of claim 1 having the formula

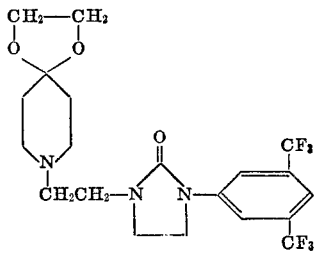

18. The compound of claim 1 having the formula
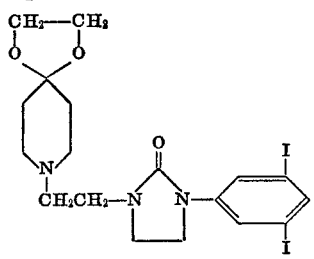
References Cited
UNITED STATES PATENTS
3,196,152   7/1965   Wright et al. _____ 260—247.2
HENRY R. JILES, Primary Examiner
G. T. TODD, Assistant Examiner
U.S. Cl. X.R.
260—309.7, 553 A; 424—267

PO-1050
(5/69)

UNITED STATES PATENT OFFICE
CERTIFICATE OF CORRECTION

Patent No. __3,702,327__   Dated __November 7, 1972__

Inventor(s) __Jorge Pengman Li and John Hans Biel__

It is certified that error appears in the above-identified patent and that said Letters Patent are hereby corrected as shown below:

In Column 2, lines 48-55, please change structural formula IV to

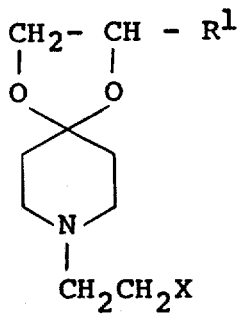

In Column 14, please change Claim 4 to read

4. A compound of claim 1 having the formula

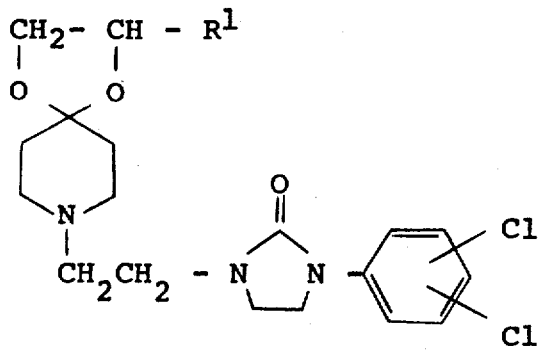

wherein $R^1$ is a member selected from the group consisting of hydrogen, (lower) alkyl, phenyl and benzyl.

Signed and sealed this 17th day of April 1973.

(SEAL)
Attest:

EDWARD M. FLETCHER, JR.
Attesting Officer

ROBERT GOTTSCHALK
Commissioner of Patents